United States Patent
Mornan et al.

(10) Patent No.: US 11,174,645 B2
(45) Date of Patent: Nov. 16, 2021

(54) ELBOW JOINT CONNECTOR

(71) Applicant: The Landmark Group, Inc., Valley Cottage, NY (US)

(72) Inventors: Jay Mornan, New City, NY (US); Quoc Tran, Valley Cottage, NY (US)

(73) Assignee: THE LANDMARK GROUP, INC., Valley Cottage, NY (US)

( * ) Notice: Subject to any disclaimer, the term of this patent is extended or adjusted under 35 U.S.C. 154(b) by 204 days.

(21) Appl. No.: 16/460,592

(22) Filed: Jul. 2, 2019

(65) Prior Publication Data

US 2021/0002904 A1  Jan. 7, 2021

(51) Int. Cl.
*E04F 11/18* (2006.01)
*F16C 11/04* (2006.01)
*F16B 7/04* (2006.01)

(52) U.S. Cl.
CPC ........ *E04F 11/1865* (2013.01); *F16B 7/0446* (2013.01); *E04F 2011/1876* (2013.01); *F16C 11/04* (2013.01)

(58) Field of Classification Search
CPC .............. E04F 11/1834; E04F 11/1865; E04F 2011/1868; E04F 11/18; E04F 11/181; E04F 11/1817; E04F 11/1838; E04F 2011/1876; E04H 17/1448; F16B 2/04; F16B 2/14; F16B 7/0413; F16B 7/0446; F16B 7/1445; F16B 7/1463; F16C 11/04;

(Continued)

(56) References Cited

U.S. PATENT DOCUMENTS 2,018,250 A * 10/1935 Cohan .................. F16B 7/0453
  403/237
3,274,744 A  9/1966 Blum et al.
(Continued)

FOREIGN PATENT DOCUMENTS

EP  0401112 A1 * 12/1990 .......... E04F 11/1817
EP  2163703 A1 *  3/2010 .......... E04F 11/1834
(Continued)

OTHER PUBLICATIONS

The above patent documents were cited on the Sep. 17, 2020 International Search Report of PCT/US2020/039154, a copy of which is enclosed.

*Primary Examiner* — Michael P Ferguson
*Assistant Examiner* — Kevin J Baynes
(74) *Attorney, Agent, or Firm* — Cowan, Liebowitz & Latman, P.C.; Mark Montague; Brian S. Matross

(57) ABSTRACT

An elbow joint connector includes an elbow portion and a locking mechanism detachably coupled to a distal end of the elbow portion. The locking mechanism including a pair of locking members translatable relative to one another along an interface transverse to a longitudinal axis of the elbow joint connector. Divergent translation of the pair of locking members relative to one another along the interface increases a portion of an outer periphery of the locking mechanism to lock the elbow portion to an adjoining member. The elbow joint connector is configured for detachable coupling to an adjoining elbow joint connector and pivotally rotatable relative thereto from a first configuration in which respective center axes of the connectors form an acute angle to a second configuration in which the respective center axes are collinear.

9 Claims, 4 Drawing Sheets

(58) Field of Classification Search
CPC ......... Y10T 403/5793; Y10T 403/7064; Y10T 403/7066; Y10T 403/7067; Y10T 403/7069; Y10T 403/76; Y10T 403/32286; Y10T 403/32319; E01F 15/0415
See application file for complete search history.

(56) References Cited

U.S. PATENT DOCUMENTS

| | | | |
|---|---|---|---|
| 3,333,873 A | 8/1967 | Triplett et al. | |
| 4,505,609 A * | 3/1985 | Vella | E04H 15/18 403/170 |
| 4,767,232 A * | 8/1988 | Francis | E04F 11/1834 403/91 |
| 5,765,812 A * | 6/1998 | Guenther | E04F 11/1804 256/65.15 |
| 6,203,239 B1 | 3/2001 | Mucciaccciaro et al. | |
| 6,457,895 B1 | 10/2002 | Salman | |
| 7,641,180 B2 | 5/2010 | Adderton | |
| 8,474,206 B2 | 7/2013 | Favell | |
| 8,714,529 B2 * | 5/2014 | Smith | E04F 11/1834 256/67 |
| 2002/0017062 A1 * | 2/2002 | Morris | F16C 11/10 49/381 |
| 2002/0110406 A1 * | 8/2002 | Coles | F16B 7/185 403/57 |
| 2003/0164488 A1 | 9/2003 | Terrels | |
| 2005/0012085 A1 | 1/2005 | Lavi et al. | |
| 2007/0189850 A1 * | 8/2007 | Minowa | F16B 7/025 403/370 |
| 2012/0326108 A1 * | 12/2012 | Eves | E04F 11/1836 256/60 |
| 2014/0191177 A1 | 7/2014 | Bailie | |
| 2016/0250509 A1 * | 9/2016 | Todokoro | F16B 12/40 403/53 |
| 2018/0258648 A1 * | 9/2018 | Kuo | E04F 11/1804 |

FOREIGN PATENT DOCUMENTS

| | | | | |
|---|---|---|---|---|
| EP | 2902566 A2 * | 8/2015 | ......... | E04F 11/1834 |
| FR | 2152941 B1 | 12/1973 | | |
| FR | 2978780 A1 * | 2/2013 | ......... | E04F 11/1808 |
| FR | 2983503 A1 * | 6/2013 | ......... | E04F 11/1836 |
| GB | 2272006 A * | 5/1994 | ......... | E04F 11/1834 |
| GB | 2295847 A * | 6/1996 | ............ | E04B 1/585 |
| GB | 2477635 A * | 8/2011 | ......... | E04F 11/1836 |
| WO | 1997/025536 A1 | 7/1997 | | |
| WO | WO-2016054676 A1 * | 4/2016 | ............... | E04G 5/14 |

* cited by examiner

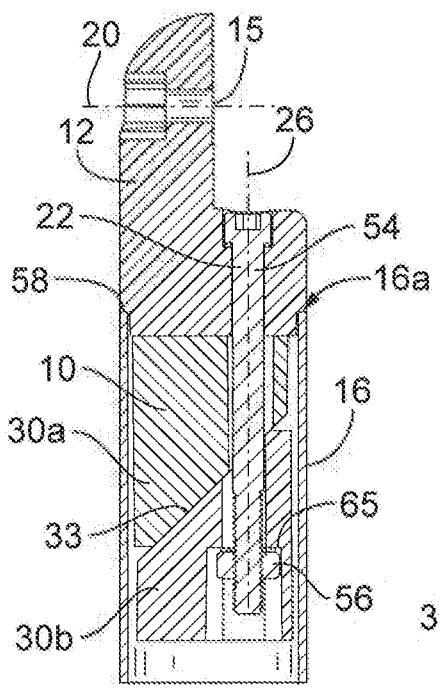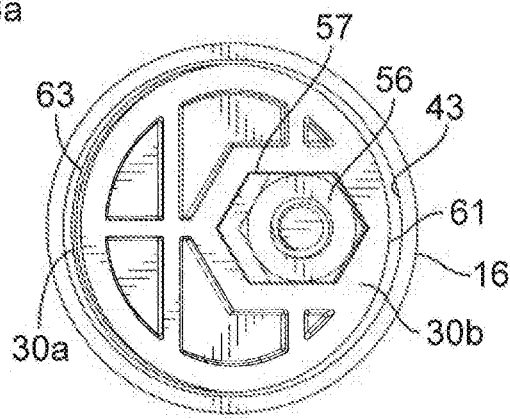
FIG. 5A  FIG. 5B
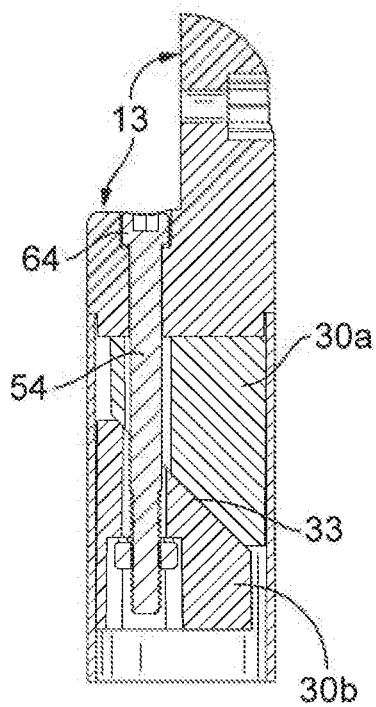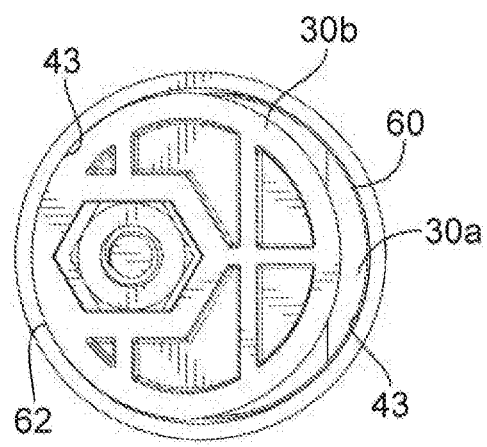
FIG. 5C  FIG. 5D

ELBOW JOINT CONNECTOR

BACKGROUND OF THE INVENTION

1. Field of the Invention

The invention relates to an elbow joint connector, and more particularly, to an elbow joint connector for use in a modular handrail system.

2. Description of the Related Art

Various modular handrail systems and other structures use hollow members made from metal and plastic in order to reduce material cost and weight, and to allow for easier assembly, setup, disassembly, and removal with less risk of injury to employees or contractors. However, such systems and structures must be able to withstand certain types and levels of loading. In tubular handrail systems, for example, stresses may include hoop, torsional, compressive, or tensile stresses, as well as bending moments caused by sudden or intermittent loads applied at various locations. Additionally, materials may expand or contract depending on varying temperatures, humidity, etc. Failures of such systems and structures often occur at joints where multiple connected members extend in different directions.

While various forms of joints and attachment means are known in the art, improved connection strength, durability, and ease of assembly and disassembly are needed, particularly with respect to handrail systems which accompany stairs and ramps used by elderly and handicapped populations.

OBJECTS AND SUMMARY OF THE INVENTION

This summary is not intended to identify or point to essential features or limit the scope of the subject matter claimed herein. The present invention relates to elbow joint systems and methodologies which utilize elbow joint connectors to connect adjoining members of modular handrail systems, with at least the following objectives:

To improve the connection strength, durability, and longevity of elbow joint connectors within handrail systems by applying greater radial holding forces to adjoining members with increased material at common failure points;

To reduce the weight and material associated with handrail systems by using light-weight plastic elbow joint connectors insertable into hollow metal adjoining members and press-fitting the elbow joint connectors to the adjoining members using detachable wedges of a locking mechanism;

To reduce the time to assemble and disassemble modular handrail systems and improve the safety thereof during their setup, use, or removal;

To provide a locking mechanism configured to manual tighten or loosen an elbow joint connector to or from an adjoining member from a location longitudinally offset from both the adjoining member and the locking mechanism; and To detachably couple two elbow joint connectors of an elbow joint with 108° of articulation therebetween, with the elbow joint connectors pivotable from a first configuration in which an angle between respective center axes thereof is 73° to a second configuration in which the angle between the respective center axes thereof is 180° (e.g., the respective center axes are collinear).

In accordance with one embodiment of the invention, an elbow joint connector comprises an elbow portion having a proximal end and a distal end. The proximal end defines a cutout region and a first through-hole from a first side of the cutout region through the proximal end along a first axis. The distal end defines a second through-hole from a second side of the cutout region through the distal end along a second axis transverse to the first axis. The elbow joint further comprises a locking mechanism detachably coupled to the distal end of the elbow portion. The locking mechanism includes a pair of locking members translatable relative to one another along an interface transverse to both the first and second directions. The pair of locking members define respective bores in communication with the second through-hole of the distal end of the elbow portion. Divergent translation of the pair of locking members relative to one another along the interface increases a portion of an outer periphery of the locking mechanism, and convergent translation of the pair of locking members along the interface decreases the portion of the outer periphery.

In certain embodiments, a bolt extends through the second through-hole and the bores of the locking members, and is used to detachably couple the elbow portion and the locking mechanism such that rotation of the bolt in a first rotative direction causes divergent translation of the pair of locking members to lock the elbow joint connector to an adjoining member. The locking mechanism can have an outer periphery which includes at least one arcuate surface configured to engage an interior surface of the adjoining member to lock the locking mechanism to the adjoining member as the bolt is rotated in the first rotative direction. The at least one arcuate surface can include first and second arcuate surfaces disposed on opposite sides of a central axis of the elbow joint connector and longitudinally offset from one another, whereby a wedge effect is achieved as the bolt is rotated in the first rotative direction and the locking mechanism is press-fit within the adjoining member.

In yet other embodiments, the second through-hole of the elbow joint connector may be configured with a circular cross-section, and the bores of the locking members may be configured with a non-circular cross-sections to allow both lateral and longitudinal translation of pair of locking members relative to the central axis of the elbow joint connector during divergent and convergent translations of the pair of locking members along the interface. The bolt detachably coupling the elbow portion and the locking mechanism may be accessible via the cutout region for manual tightening thereof to attach the adjoining member to the locking mechanism. The proximal end of the elbow portion is preferably configured to detachably couple to an additional elbow portion of an adjoining elbow joint connector with the elbow portion and the additional elbow rotatable relative to one another, whereby the elbow joint connector is pivotable relative to the adjoining elbow joint connector.

In accordance with certain embodiments, the elbow joint connector can define a first center axis, the adjoining elbow joint connector can define a second center axis, and the elbow joint connector and the adjoining elbow joint connectors may be pivotable relative to one another from a first configuration in which an angle between the first and second center axes is approximately 73° to a second configuration in which the angle between the first and second center axes is approximately 180°. The proximal end of the elbow portion may define a hexagonal recess in communication with the first through-hole, and be configured to receive and rotatably fix a nut relative to the proximal end of the elbow joint connector during attachment of the adjoining elbow joint connector to the elbow joint connector.

In accordance with another embodiment of the invention, an elbow joint system comprises a first elbow joint connector defining a first center axis and having a first elbow portion with a first proximal end and a first distal end, and a first locking mechanism detachably coupled to the first distal end of the first elbow portion. The first locking mechanism includes a pair of locking members configured to translate relative to one another. The elbow joint system further comprises a first adjoining member having an interior surface detachably coupled to the first pair of locking members of the first locking mechanism, a second elbow joint connector which defines a second center axis and has a second elbow portion with a second proximal end and a second distal end, and a second locking mechanism detachably coupled to the second distal end of the second elbow portion. The elbow joint system further comprises a second adjoining member detachably coupled to the second locking mechanism. The first and second elbow joint connectors are detachably coupled and pivotable relative to one another about the respective first and second proximal ends of the respective first and second elbow portions from a first configuration to a second configuration through an angular range of at least 90°.

In certain embodiments, a fastener extends substantially parallel to the first center axis through the first elbow portion and the first locking mechanism such that rotation of the fastener in one direction increases a diameter of an outer peripheral portion of the first locking mechanism to lock the first locking mechanism to an inner surface of the first adjoining member and apply a plurality of holding forces thereto. Rotation of the fastener in an opposite direction causes a decrease in the diameter of the outer peripheral portion of the first locking mechanism to release the first locking mechanism from the inner surface of the first adjoining member. The plurality of holding forces may include a plurality of radial forces perpendicular to the first center axis, including a first holding force applied along a first portion of one of the pair of the locking members, and a second holding force applied along a second portion of the other of the pair of the locking members. The first and second portions may be disposed on opposite sides of the center axis and longitudinally offset from one another.

In accordance with certain embodiments, the first and second adjoining members may be handrails of a modular ramp system. The first and second elbow joint connectors may be made of plastic, the first and second adjoining members may be hollow metal tubes, the first adjoining member may be configured to fully receive the first locking mechanism, and the second adjoining member may be configured to fully receive the second locking mechanism. The first distal end of the first elbow portion preferably includes a distal edge and at least one support flange extending through and longitudinally beyond the distal edge. The first adjoining member preferably includes a proximal edge, and in an assembled configuration, the pair of locking members of the first locking mechanism and the at least one support flange of the first distal end of the first elbow portion are disposed completely within the first adjoining member, and the proximal edge of the first adjoining member is flush with the distal edge of the first elbow portion, whereby the at least one support flange help brace the elbow portion and maintain its alignment with the adjoining member. A distal one of the pair of locking members can define a hexagonal recess configured to receive and rotatably fix a nut relative to the distal locking member during attachment or detachment of the first locking mechanism to the first elbow portion.

Other objects, features, advantages, and characteristics of the present invention, as well as the methods of operation and functions of related structural elements, and the combination of parts and economies of development and manufacture, will become readily apparent to those of ordinary skill in the art upon consideration of the detailed description below with reference to the accompanying drawings, all of which form a part of this specification.

BRIEF DESCRIPTION OF THE DRAWINGS

A further understanding of the present invention can be obtained by reference to preferred embodiments set forth in the illustrations of the accompanying drawings. The drawings are not intended to limit the scope of this invention, which is set forth with particularity in the claims as appended or as subsequently amended, but merely to clarify and exemplify the invention. Accordingly, a more complete appreciation of the present invention and many of the attendant aspects thereof may be readily obtained as the same becomes better understood by reference to the following detailed description when considered in conjunction with the accompanying drawings, where:

FIG. 5A is a side sectional view of an assembled elbow joint connector and adjoining member detachably coupled by a fastener in an unlocked configuration in accordance with various embodiments of the invention;

FIG. 5B is a bottom view of the assembled elbow joint connector, adjoining member, and fastener of FIG. 5A in the unlocked configuration;

FIG. 5C is an opposite side sectional view of the assembled elbow joint connector, adjoining member, and fastener of FIG. 5A in a locked configuration in accordance with various embodiments of the invention;

FIG. 5D is a bottom view of the assembled elbow joint connector, adjoining member, and fastener of FIG. 5C in the locked configuration;

DETAILED DESCRIPTION OF THE PRESENT INVENTION

Figure 1:
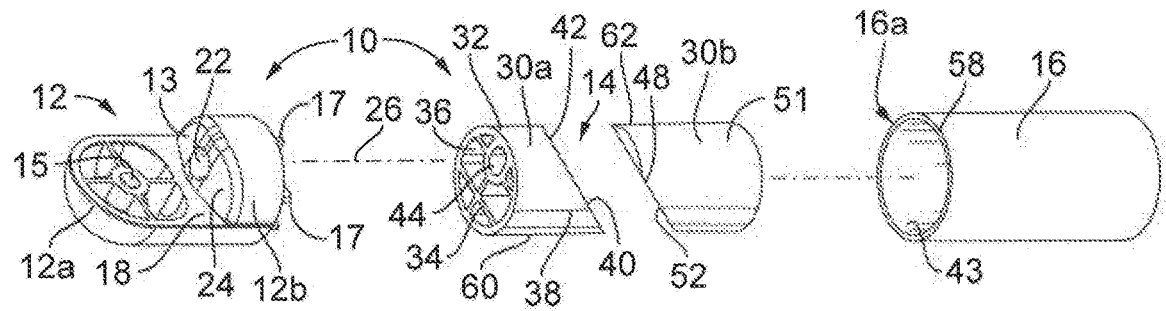
FIG. 1 is an exploded perspective view of an elbow joint connector and an adjoining member in accordance with various embodiments of the invention.

The present disclosure is not intended to be limited to the specific terminology so selected, and it is to be understood that each specific element includes all technical equivalents which operate in a similar manner. Specific embodiments that may be practiced are shown by way of illustration and explanation. The embodiments are described in sufficient detail to enable those skilled in the art to practice the embodiments, and it is to be understood that logical, mechanical, and other changes may be made without departing from the scope of the embodiments. The following detailed description is therefore not to be taken in a limiting sense. In describing exemplary embodiments of the present invention illustrated in the drawings, specific terminology is employed for sake of clarity.

Referring to FIG. 1, an elbow joint connector 10 includes an elbow portion (e.g., swivel) 12 and a locking mechanism 14 configured to engage an adjoining member 16. Elbow joint connector 10 may be used in modular systems having multiple adjoining members which need to be connected to one another with sufficient holding strength, ease of assembly, and relative articulation. By way of example, as further discussed below, elbow joint connector 10 may be used to join adjacent handrail tubing sections of a modular ramp system, and can improve such a system by preventing joints connecting adjoining members thereof from failing (e.g., disengaging, dislodging, bending, etc.) under single or repeated loads.

The elbow portion 12, best shown in FIGS. 2A-2D, has a proximal end 12a and a distal end 12b. Proximal end 12a defines an L-shaped cutout region 13 and a first through-hole 15 from a first side 18 of cutout region 13 through proximal end 12a along a first axis 20 extending in a first direction. Distal end 12b is generally cylindrical in shape, and defines a second through-hole 22 from a second side 24 of cutout region 13 through distal end 12b along a second axis 26 in a second direction transverse (e.g., perpendicular) to first axis 20. Distal end 12b includes one or more fins or struts 17 extending across a hollow region 19 (FIG. 2D) of distal end 12b. Hollow region 19 is defined by an internal surface 21 of distal end 12b. As shown, fins/struts 17 extend across hollow region 19 between and abut against internal surface 21. Fins/struts 17 also intersect one another and an internal cylindrical wall 23 which defines at least a portion of second through-hole 22. Fins/struts 17 and cylindrical wall 23 may be integrally formed as one piece, inserted into hollow region 19 of distal end 12b of elbow portion 12, and attached to internal surface 21 by adhesive, press fit, or any other suitable attachment means. Alternatively, fins/struts 17 and cylindrical wall 23 may be integrally formed with distal end 12b of elbow portion 12. Fins/struts 17 also preferably extend to a distal end 25 longitudinally offset from a distal edge 27, whereby the portions thereof extending longitudinally beyond distal edge 27 to distal end 25 are configured to be inserted into adjoining member 16 along with locking mechanism 14 (further discussed below). Fins/struts 17 provide added strength to elbow portion 12, brace distal end 12b, and can provide additional resistance to bending moments and other stresses applied to elbow joint connector 10 by adjoining member 16 during loading. In certain embodiments, elbow portion 12 may be manufactured as a single integrally formed piece through injection molding, and made of a nylon blend with impact modifiers and UV inhibitors (e.g., Nylon 6).

Figure 2A:
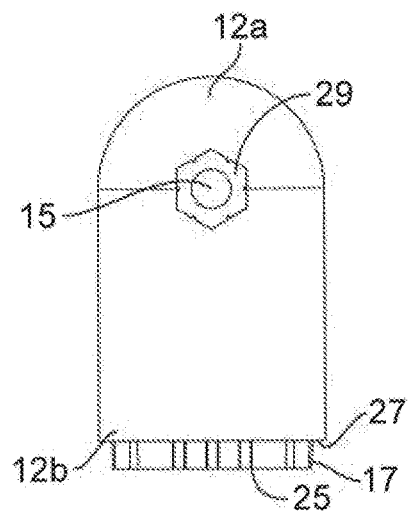
FIG. 2A is a top view of an elbow portion of the elbow joint connector of FIG. 1.
Figure 2B:
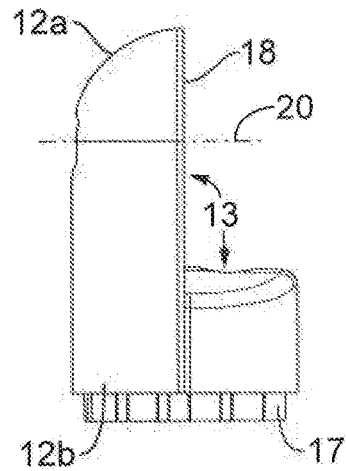
FIG. 2B is a side view of the elbow portion.
Figure 2C:
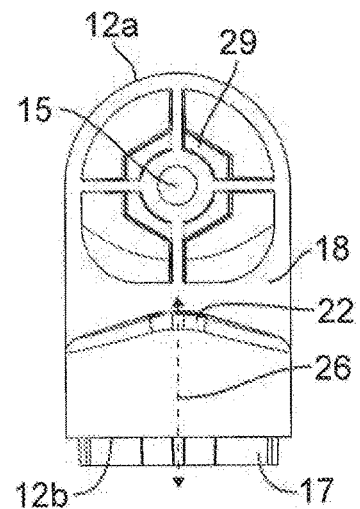
FIG. 2C is a bottom view of the elbow portion.
Figure 2D:
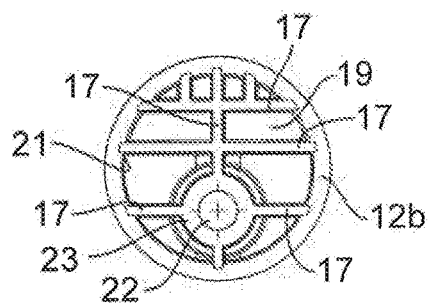
FIG. 2D is a rear view of the elbow portion.
Figure 3A:
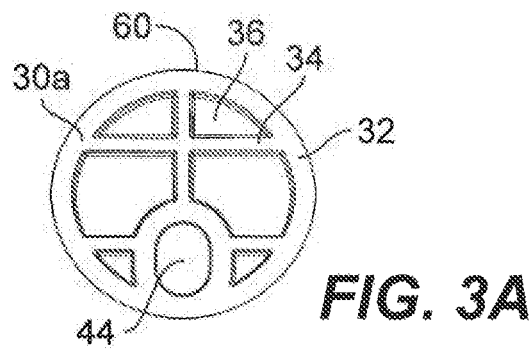
FIG. 3A is a front view of the proximal locking member of the elbow joint connector of FIG. 1.
Figure 3B:
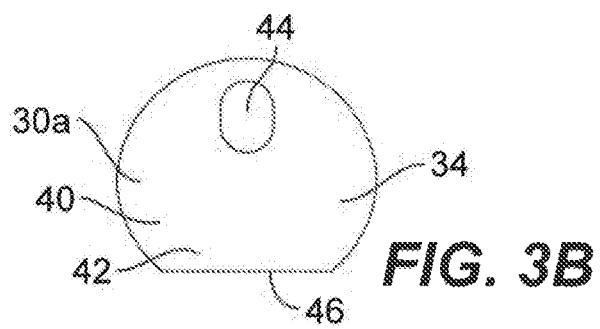
FIG. 3B is a rear view of the proximal locking member.

As best shown in FIGS. 2A, 2C, proximal end 12a of elbow portion 12 defines a hexagonal recess 29 in communication with first through-hole 15 on a top portion thereof. Hexagonal recess 29 is configured to receive and rotatably fix a nut, whereby proximal end 12a of elbow portion 12 can receive an additional elbow portion within L-shaped cutout region 13, and pivotally attach the additional elbow portion to allow relative articulation therebetween (further discussed below with respect to FIGS. 6A, 6B).

Referring to FIGS. 1 and 3A-4B, locking mechanism 14 of elbow joint connector 10 is configured to detachably couple to distal end 12b of elbow portion 12 by a fastener such as a bolt, and to be inserted into adjoining member 16 for detachable engagement therewith using a holding force whose magnitude is controlled by torque applied to the bolt (further discussed below with respect to FIGS. 5A-SD). Locking mechanism 14 includes a pair of locking members or wedges 30a, 30b. Proximal locking member 30a, best shown in FIGS. 3A and 3B, includes a generally cylindrical proximal end 32 having a plurality of fins/struts 34 extending within a hollow region 36 thereof, and a wedge shaped distal end 38 with a wedge portion 40. Wedge portion 40 includes a generally planar engagement surface 42 configured for translation along an interface with an engagement surface of distal locking member 30b. Proximal locking member 30a defines a non-circular (e.g., oval shaped) bore 44 therethrough. Oval shaped bore 44 is configured to be in communication with second through-hole 22 of distal end 12b of elbow portion 12. Proximal locking member 30a also defines a radially extending surface 46 (FIG. 3B) transverse to planar sloped engagement surface 42 (FIG. 1) to facilitate relative translation of the pair of locking members 30a, 30b.

Figure 4A:
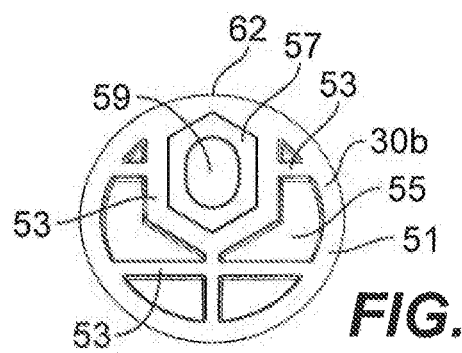
FIG. 4A is a rear view of a distal locking member of the elbow joint connector of FIG. 1.
Figure 4B:
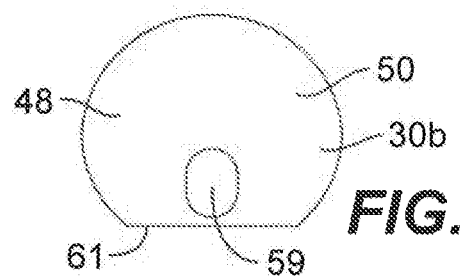
FIG. 4B is a front view of the distal locking member.

Distal locking member 30b, best shown in FIGS. 4A, 4B includes a wedge shaped proximal end 48 having a wedge portion 50, and a generally cylindrical distal end 51 having a plurality of fins/struts 53 extending within a hollow region 55 thereof. Wedge portion 50 includes a generally planar engagement surface 52 configured for translation along planar engagement surface 42 of wedge portion 40 of proximal locking member 30a. Distal end 51 also includes a plurality of walls within hollow region 55 which define a hexagonal recess 57 for receiving and rotatably fixing a nut. Distal locking member 30b defines a non-circular (e.g., oval shaped) bore 59 therethrough. Oval shaped bore 59 is configured to be in communication with bore 44 of proximal locking member 30a. Distal locking member 30b also defines a radially extending surface 61 (FIG. 3B) transverse to engagement surface 52 to facilitate relative translation of the pair of locking members 30a, 30b along their respective engagement surfaces 42, 52. In certain embodiments, locking members 30a, 30b of locking mechanism 14 may each be manufactured through injection molding, and made of a glass fiber filled (e.g., 33% nylon blend) with impact modifiers and UV inhibitors (e.g., Nylon 66). The glass fiber filled nylon provides additional strength and stiffness, and lowers thermal expansion/contraction compared to non-glass filled nylon.

In accordance with various embodiments, elbow portion 12 and locking members 30a, 30b may be plastic or other lightweight material. Adjoining member 16 may be, for example, a hollow plastic or metal tube such as aluminum as shown (e.g., a cylindrical aluminum rail of a handrail system).

Referring to FIGS. 5A and 5B, elbow joint connector 10 is shown detachably coupled to adjoining member 16 and operatively disposed in an assembled unlocked configuration. As shown, engagement surfaces 42, 52 of locking members 30a, 30b are configured to translate relative to one another along an interface 33 transverse to both first and second axes 20, 26. Elbow portion 12 and locking members 30a, 30b of locking mechanism 14 of elbow joint connector 10 are detachably coupled to one another by a bolt 54. Bolt 54 extends along second axis 26, through second through-hole 22, oval shaped bores 44, 59 of proximal and distal locking members 30a, 30b, and through a nut 56, which is received within hexagonal recess 57 of distal locking member 30b.

Continuing with reference to FIGS. 5A, 5B, locking members 30a, 30b have been inserted into a proximal end 16a of adjoining member 16. An interior surface 43 of adjoining member 16 and respective exterior surfaces 61, 63 of locking members 30a, 30b define a gap 46 therebetween. Thus, in this unlocked configuration, locking mechanism 14 is longitudinally translatable within adjoining member 16 along or parallel to second axis 26. Locking mechanism 14 is preferably fully translated (e.g., slid) into adjoining member 16 until an outer proximal rim or proximal edge 58 (FIG. 1) of adjoining member 16 is flush with the distal edge 27 (FIG. 2A) of distal end 12b of elbow portion 12 with distal ends 25 of struts 17 of elbow portion 12 disposed within proximal end 16a of adjoining member 16.

As shown in FIG. 5B and described above with respect to FIG. 4A, nut 56 is rotatably fixed within hexagonal recess 57 of distal locking member 30b. Thus, it will be appreciated that rotation of bolt 54 in a first rotative direction (e.g., a clockwise direction) biases distal locking member 30b in a proximal direction (e.g., toward proximal locking member 30a and elbow portion 12) because nut 56 abuts a distal wall 65 (FIG. 5A) at a proximal end of hexagonal recess 57. Threaded nut 56 thus provides a proximal compressive force to distal locking member 30b as bolt 54 is rotated in the clockwise direction about second axis 26. Such proximal compressive force biases distal locking member 30b to move/translate along interface 33, which extends transverse to both the first and second axes 20, 26. In other words, distal locking member's 30b translation direction along interface 33 includes both a proximal direction component parallel to second axis 26 and a radial direction component (e.g., perpendicular to second axis 26, parallel to first axis 20). Similarly, proximal locking member 30a is biased to move/translate along interface 33 in an opposite direction which includes both a distal direction component parallel to second axis 26 and a radial direction component (e.g., perpendicular to second axis 26 parallel to first axis 20). Such movement of locking members 30a, 30b along interface 33 away from the unlocked configuration of FIGS. 5A and 5B toward the locked configuration of FIGS. 5C and 5D is herein referred to as divergent movement or divergent translation.

As best shown in FIGS. 5C and 5D, divergent translation of locking members 30a, 30b causes of the pair of locking members 30a, 30b to lock to inner surface 43 of adjoining member 16, thereby locking elbow joint connector 10 to adjoining member 16. It will be appreciated that such divergent translation changes (e.g., increases) at least one dimension of the outer periphery of locking mechanism 14 in the radial direction relative to the center axis of the elbow joint connector 10, or relative to second axis 26. In particular, an effective diameter of the outer periphery of locking mechanism 14 (e.g., the sum of two radii of respective longitudinally offset cross sections of locking members 30a, 30b relative to second axis 26) increases during divergent movement of locking members 30a, 30b. Such outer periphery of locking mechanism 14 includes a first arcuate outer surface 60 (FIGS. 1, 3A) of proximal locking member 30a and a second arcuate surface 62 (FIGS. 1, 4A) of distal locking member 30b. First and second arcuate exterior surfaces 60, 62 are convex and configured to engage portions of concave interior surface 43 of adjoining member 16 on opposite sides of second axis 26 or a center axis of the elbow joint connector 10 to lock locking mechanism 14 to adjoining member 16 as bolt 54 is rotated in the first rotative (e.g., clockwise) direction.

It will be appreciated that first and second arcuate exterior surfaces 60, 62 are longitudinally offset from one another, and create a wedge effect within adjoining member 16 when locking mechanism 14 is tightened via rotation of bolt 54. It will also be appreciated that L-shaped cutout region 13 allows for manual access of a head 64 of bolt 54 for tightening thereof, and that increased torque applied to bolt 54 in the first rotative, clockwise direction (e.g, using an Allen wrench) increases the radial holding forces applied to inner surface 43 of adjoining member 16 as locking members 30a, 30b are forced further radially outward and press against inner surface 43 with increased force as bolt 54 is further tightened. Conversely, counter-clockwise rotation of bolt 54 causes the pair of locking members 30a, 30b to each reverse direction (e.g., move in a convergent direction relative to one another), thus decreasing the outer periphery of locking mechanism 14 and unlocking elbow joint connector 10 from adjoining member 16 as arcuate exterior surfaces 60, 62 disengage from interior surface 43.

It will be appreciated that the holding forces applied to inner concave surface 43 include radial forces applied by arcuate convex exterior surfaces 60, 62 along respective longitudinal portions of the cylindrical wedge portions of locking members 30a, 30b on opposite sides of the center axis of the elbow joint connector 10. Such longitudinal portions can distribute loading during bending moments and other stresses applied to elbow joint connector 10 from adjoining member 16 during use (e.g., if a patient suddenly falls and grabs a handrail adjoining member for support). Struts 17 of elbow portion additionally contact interior surface 43 of adjoining member 16 and help brace and maintain alignment of elbow portion 12 with adjoining member 16. It will also be appreciated that the radial holding forces applied by arcuate convex exterior surfaces 60, 62 are applied over larger surface areas (e.g., longitudinally extending portions thereof with substantially cylindrical cross sections wedged on opposite sides) than conventional joints used in such applications, which traditionally use ribs that can wear down over time and only apply holding forces at particular points). Surfaces 60, 62 contour to inner surface 43 of adjoining member 16, and in certain embodiments, apply an outward force along at least two to three inches (e.g., 2.25") of proximal end 16a of adjoining member 16. This adjustable attachment along larger surface areas helps prevent elbow joint connector 10, and in particular, locking mechanism 14, from disengaging from adjoining member 16 while also increasing the strength of the joint itself at the connection by adding substantially more material where common failure points occur, and by better distributing loads applied to the adjoining member 16 in a longitudinal direction. Locking mechanism 14 of elbow joint connector 10 also does not require use of a bonding agent or adhesive, can be easily tightened or loosened as needed, and does not require specially cut abutting adjoining members.

For example, with current elbow connections which employ radially extending fins which engage and crush when inserted into a connecting handrail tube, once the elbow connections are inserted, no additional radial force can be applied to strengthen the connection. Additionally, with conventional elbow connections employing such fins, the section inserted into the handrail is hollow and can collapse under high stress, causing the conventional elbow portion to disengage from the handrail. By contrast, as described above, elbow joint connector 10 is able to apply greater holding forces across a greater surface area by utilizing cylindrical wedges (e.g., locking members 30a, 30b) which when under compression expand outward and apply radial/holding forces which further increase as bolt 54 is turned in a first (e.g., clockwise) direction. Additionally, locking members 30a, 30b inserted into adjoining member 16 are respectively reinforced with material such as ribs 34, 53 for added strength.

During the convergent and divergent movement of locking members 30a, 30b described above, the non-circular (e.g., oval) cross sections of bores 44, 59 allow for lateral translation of locking members 30a, 30b (as well as longitudinal translation) relative to bolt 54. Second through-hole 22 of elbow portion 12 may be configured with a circular cross section as elbow portion 12 does not translate radially relative to bolt 54 during convergent and divergent translation of locking members 30a, 30b.

Figure 6A:
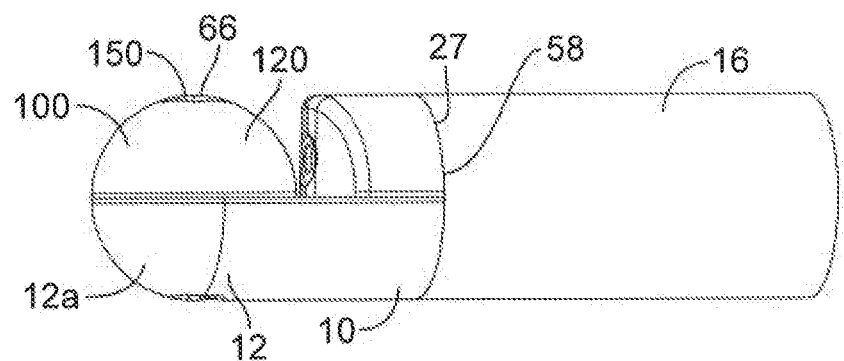
FIG. 6A is a side perspective view of an elbow joint system with a first elbow joint connector and a second elbow joint connector detachably and pivotally connected to one another with their respective center axes defining an angle of 90° in accordance with various embodiments of the invention.
Figure 6B:
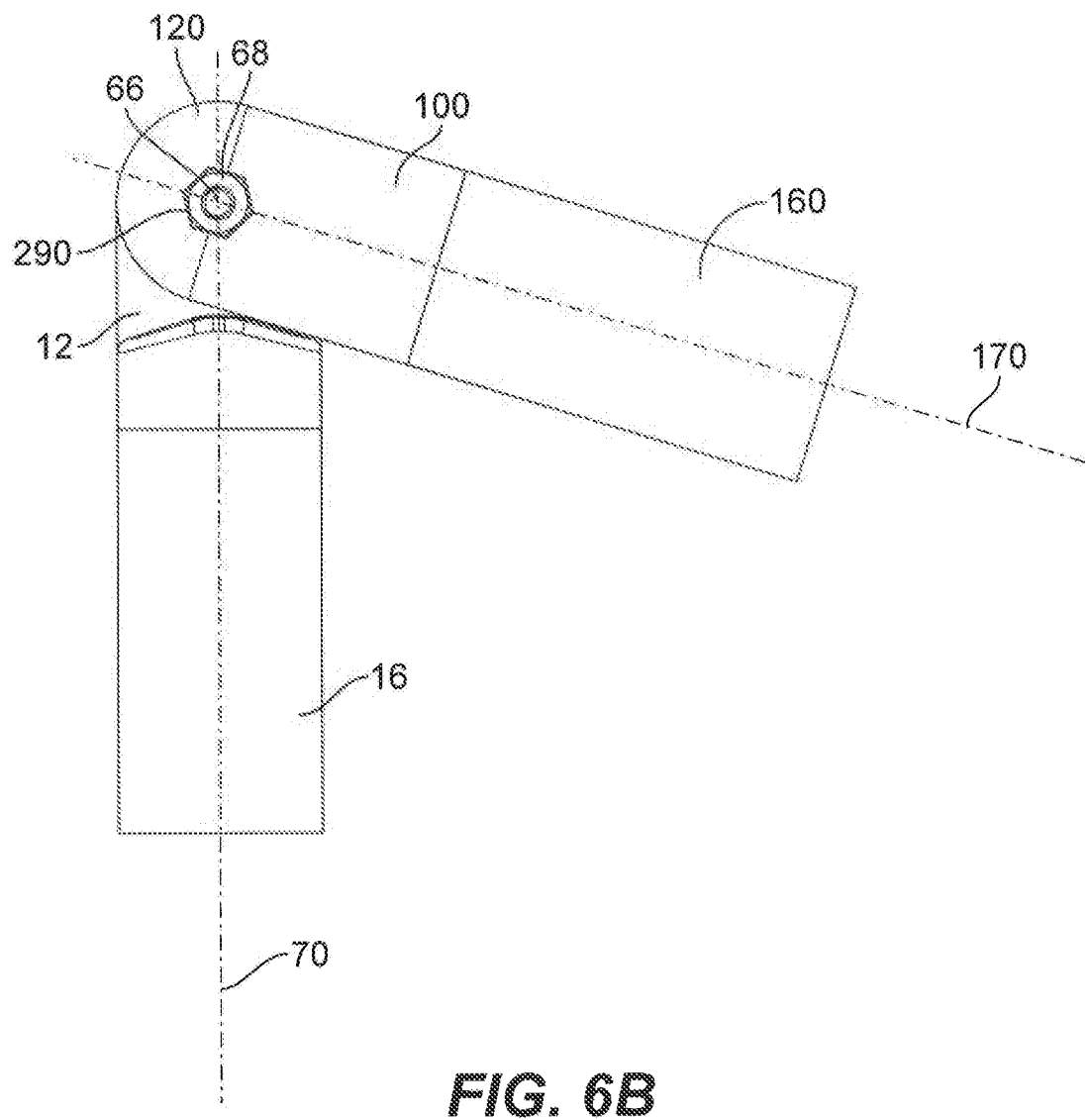
FIG. 6B is a top perspective view of the elbow joint system of FIG. 6A with the first elbow joint connector and the second elbow joint connector in a configuration in which their respective center axes define an angle of 73° accordance with various embodiments of the invention.

Referring to FIGS. 6A, 6B, elbow joint connector 10 is assembled and locked to adjoining member 16 with distal edge 27 abutting and flush with proximal edge 58 of adjoining member 16, and with locking members 30a, 30b (not shown) operatively disposed inside and locked to adjoining member 16. Elbow portion 12 of elbow joint connector 10 is detachably couple to an additional elbow portion 120 of an adjoining elbow joint connector 100 with the elbow portion 12 and the additional elbow portion 120 rotatable relative to one another such that elbow joint connector 10 is pivotable relative to adjoining elbow joint connector 100. Elbow portion 12 and additional elbow portion 120 may be detachably coupled by a bolt 66 extending through first through-hole 15 of elbow portion 12, a corresponding through-hole 150 through additional elbow portion 120, and a nut 68 received and rotatably fixed within hexagonal recess 290 of adjoining elbow joint connector 100. In certain embodiments, adjoining elbow joint connector 100 and additional adjoining member 160 may be identical to, respectively, elbow joint connector 10 and adjoining member 16.

In accordance with certain embodiments, elbow joint connector 10 defines a first center axis 70, adjoining elbow joint connector 100 defines a second center axis 170, and elbow joint connector 10 and adjoining elbow joint connector 100 are pivotable relative to one another from a first configuration (FIG. 6B) in which an angle between the first and second center axes 70, 170 is approximately 73° to a second configuration in which the angle between the first and second center axes is approximately 180° (e.g., the first and second center axes 70, 170 are collinear with each other). In FIG. 6A, the angle between the first and second center axes 70, 170 may be 90°.

It will be appreciated that the elbow joint connector and system disclosed herein improves the connection strength, durability, longevity, safety, and easy of assembly and disassembly of elbow joint connectors used in modular systems such as handrail systems. The elbow joint connector applies greater radial holding forces to adjoining members with increased material at common failure points via a locking mechanism configured for manual tightening or loosening from an accessible location longitudinally offset from the locking members. Detachable coupling of two such elbow joint connectors facilitates creation of a joint with 108° of articulation between the elbow joint connectors (e.g., from a first configuration in which an angle between respective center axes thereof is 73o to a second configuration in which the respective center axes are collinear).

It will be appreciated that while various types of fasteners, structural shapes, and tightening means have been disclosed in the embodiments herein, such as hexagonal nuts and recesses, bolts, etc., other suitable fasteners and fastening mechanisms may be utilized. While the elbow joint connectors disclosed herein may be utilized in conjunction with hollow tubular handrails of a modular ramp system, the embodiments described herein may be employed in other modular systems requiring elbow joint connectors. It will also be appreciated that various shapes and dimensions may be utilized, and that embodiments described herein may be combined.

It will also be understood that phrases or terminology employed herein is for purposes of description and not limitation. While the present invention has been shown and described with reference to various preferred embodiments, those skilled in the art will readily appreciate that various changes and/or modifications may be made without departing from the spirit and scope of the invention as defined by the claims. Any exemplary embodiments described herein are merely illustrative, and many variations can be introduced without departing from the spirit of the disclosure or from the scope of the appended claims. The scope of the invention, therefore, shall be defined solely by the following claims. Therefore, it is intended that the appended claims be interpreted as including the embodiments described herein, the alternatives mentioned above, and all equivalents thereto.

What is claimed is:

1. An elbow joint system, comprising:
an elbow portion having a proximal end and a distal end, the proximal end defining a cutout region and a first through-hole from a first side of the cutout region through the proximal end in a first direction, the distal end having a hollowed distal edge and at least one support flange extending within and longitudinally beyond the hollowed distal edge, the distal end defining a second through-hole with a circular cross-section from a second side of the cutout region through the distal end in a second direction transverse to the first direction, wherein the distal end of the elbow portion includes an internal cylindrical surface defining a hollow region proximal of the hollow distal edge, and the at least one support flange extends completely across the hollow region and supports opposite sides of the internal cylindrical surface;
a locking mechanism detachably coupled to the distal end of the elbow portion, the locking mechanism including a pair of locking members translatable relative to one another along an interface transverse to both the first and second directions, the pair of locking members defining a bore with a non-circular cross-section in communication with the second through-hole of the distal end of the elbow portion, wherein divergent translation of the pair of locking members relative to one another along the interface increases a portion of an outer periphery of the locking mechanism, and convergent translation of the pair of locking members along the interface decreases the portion of the outer periphery, and wherein each of the pair of locking members is longitudinally translatable in the second direction and laterally translatable in the first direction relative to the elbow portion;
an adjoining member having a proximal edge and an interior surface, wherein in an assembled configuration, the pair of locking members of the locking mechanism and a portion of the at least one support flange of the distal end of the elbow portion are received by and disposed completely within and interface with the interior surface of the adjoining member, and the proximal edge of the adjoining member is flush with the hollowed distal edge of the elbow portion; and a fastener extending through the second through-hole and the bore for detachably coupling the elbow portion and the locking mechanism, wherein rotation of the fastener in a first rotative direction causes the divergent translation of the pair of locking members to lock the elbow joint portion and the locking mechanism to the adjoining member.

2. The elbow joint system according to claim 1, wherein the fastener is a bolt.

3. The elbow joint system according to claim 1, wherein the outer periphery of the locking mechanism includes at least one arcuate surface configured to engage the interior surface of the adjoining member to lock the locking mechanism to the adjoining member as the fastener is rotated in the first rotative direction.

4. The elbow joint system according to claim 3, wherein the adjoining member is a hollow tube, the interior surface is a concave interior surface, and the at least one arcuate surface of the outer periphery of the locking mechanism engages the concave interior surface of the adjoining member, wherein the at least one arcuate surface includes a first arcuate surface of one of the pair of locking members and a second arcuate surface of the other of the pair of locking members, and the first and second arcuate surfaces are disposed on opposite sides of a central axis of the elbow joint connector.

5. The elbow joint system according to claim 2, wherein the bolt is accessible via the cutout region for manual tightening thereof to attach the adjoining member to the locking mechanism.

6. The elbow joint system according to claim 2, further comprising:

an adjoining elbow joint connector having an additional elbow portion, wherein the proximal end of the elbow portion is configured to detachably couple to the additional elbow portion of the adjoining elbow joint connector with the elbow portion and the additional elbow rotatable relative to one another, whereby the elbow portion is pivotable relative to the adjoining elbow joint connector.

7. The elbow joint system according to claim 6, wherein the elbow portion and the locking mechanism define a first center axis, the adjoining elbow joint connector defines a second center axis, and the elbow joint portion and the adjoining elbow joint connector are pivotable relative to one another from a first configuration in which an angle between the first and second center axes is approximately 73° to a second configuration in which the angle between the first and second center axes is approximately 180°.

8. The elbow joint system according to claim 6, wherein the proximal end of the elbow portion defines a hexagonal recess in communication with the first through-hole and configured to receive and rotatably fix a nut relative to the proximal end of the elbow portion during attachment of the adjoining elbow joint connector to the elbow portion.

9. The elbow joint system according to claim 1, wherein the outer periphery of each locking member includes an engagement portion defining a planar surface, the respective planar surfaces of the locking members are slidably translatable relative to one another, and the pair of locking members have substantially solid cross-sections along their respective engagement portions.

* * * * *